(No Model.)
M. LARY.
SIEVE FOR FLOUR OR SIMILAR SUBSTANCES.
No. 416,228. Patented Dec. 3, 1889.
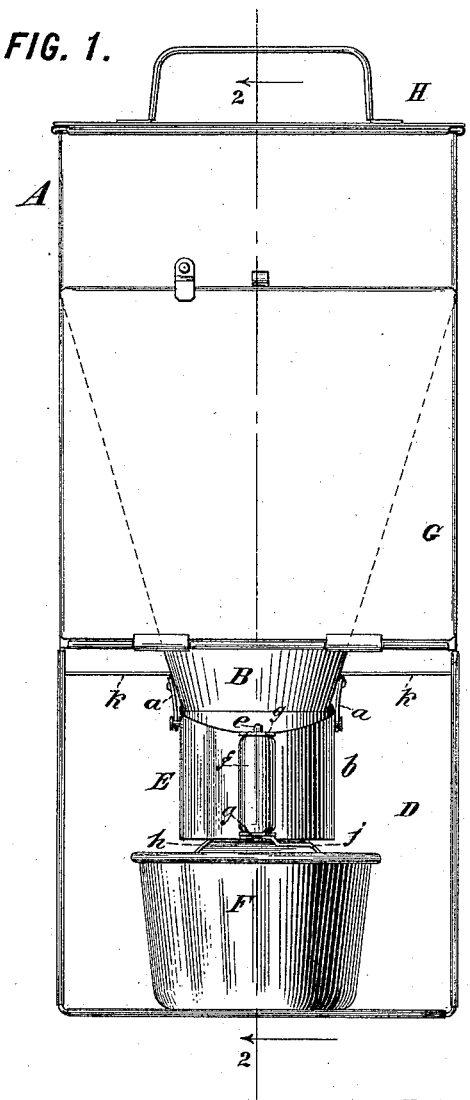
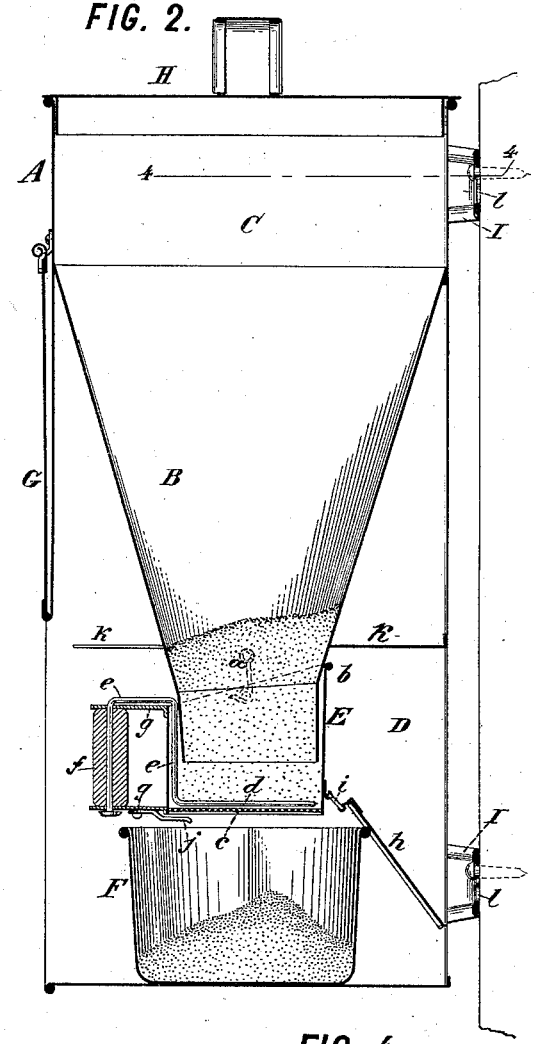
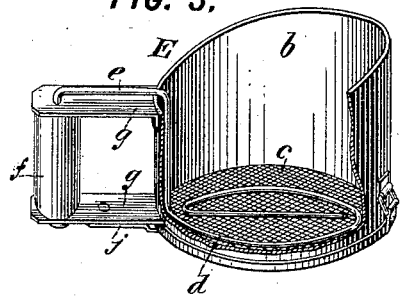
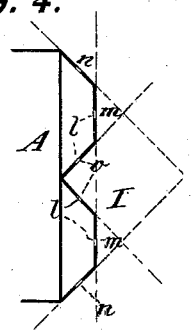
WITNESSES:
Fred White
C. K. Fraser
INVENTOR:
Morris Lary
By his Attorneys,
Arthur C. Fraser

UNITED STATES PATENT OFFICE.

MORRIS LARY, OF NEW YORK, N. Y.

SIEVE FOR FLOUR AND SIMILAR SUBSTANCES.

SPECIFICATION forming part of Letters Patent No. 416,228, dated December 3, 1889.

Application filed June 29, 1889. Serial No. 316,013. (No model.)

*To all whom it may concern:*

Be it known that I, MORRIS LARY, a citizen of the United States, residing in the city, county, and State of New York, have invented certain new and useful Improvements in Sieves for Flour and Similar Substances, of which the following is a specification.

This invention relates to that class of sieves wherein the flour is placed in a closed receptacle and is sifted as it is withdrawn therefrom. Such devices are usually adapted to be placed in any convenient part of a room or to be supported against a wall.

In the accompanying drawings, which illustrate my invention, Figure 1 is a front elevation of a sieve provided with my improvements. Fig. 2 is a vertical mid-section thereof cut on the line 2 2 in Fig. 1 and looking in the direction of the arrow. Fig. 3 is a fragmentary perspective view of the sifting-cup removed. Fig. 4 is a fragmentary horizontal section, on a smaller scale, cut on the line 4 4, Fig. 2.

Referring to the drawings, let A designate the inclosing-case, which is divided by a tapering spout B into a receiving-chamber C and a sifting-chamber D.

Let E represent a sieve connected to the lower end of the spout B, and F an ordinary dish or pan under the sieve. The door G is hinged to the front of the case A and serves to close the sifting-chamber D.

The receiving-chamber C is closed at its top by a cover H, and at its discharge-outlet at the lower end of the spout B by the sieve E, which engages the end of the spout B, and is connected thereto by the hooks *a a*, which are pivoted on the spout B and engage projections on the cup *b* of the sieve.

The sieve E is constructed of a cup *b*, which fits over the lower end of the spout B, and which is provided with a flat screen *c* in its bottom. The agitator *d* is arranged within the cup *b* and directly over the screen *c*. The agitator *d* is provided with a stem *e*, which is connected to the agitator *d* at one end and to a handle *f* of the sieve at the other end. The handle *f* is mounted to oscillate in bearings *g g*, connected to the cup *b*. As the handle *f* is oscillated an oscillatory motion is conveyed through the stem *e* to the agitator *d*. I accomplish the action of the agitator *d* with the handle *f* by extending the stem *e* upward vertically from the point of its connection with the agitator *d*, close to the side wall of the cup *b*, to and over the top of the cup, and thence horizontally above the handle *f* thereof, and thence downwardly into and through the handle *f* axially thereof, and to fasten it thereto, whereby the stem *e* of the agitator *d* forms the axle-handle *f*.

In order to close the sieve E when desired, I construct it with a cover *h*, hinged to it by the link-hinge *i* and fitting against its bottom side below the screen *c*, and I provide a fastening *j* on the bearing *g*, whereby, when the cover *h* is closed against the screen *c*, it can be held in place thereagainst by the fastenings *j*.

In order to utilize the space between the outer walls of the spout B and the side walls of the case A in the sifting-chamber D, I provide shelves *k k*, which extend horizontally between the spout B and the side walls of the case. These shelves may be used for holding any culinary utensils which it is desired to use in connection with the sieve.

The case A is so constructed that it will stand vertically upon any flat surface; but as it is found more convenient to hang the case against a wall, flour-sifters are usually constructed to be supported in this manner. I prefer to accomplish this by providing one or more supporting-bails I I on the back of the case A. Suitable holes *l l* are formed in these bails, and are adapted to take over nail-heads or other suitable devices projecting from a wall and thereby support the case A.

As it is often convenient to support the sieve by hanging it in the corner of a wall, or against a projecting corner, I construct my improved supporting device so that the sieve can be supported in either of such places or against a parallel surface. To accomplish this I construct the bails I I with faces extending in planes corresponding to the directions of the various surfaces against which it is desired to support the sieve.

For supporting the sieve against a parallel surface I provide the bails I I with one or more faces *m m*, which extend in a plane parallel with the wall of the case A, to which the bails are attached, as shown most clearly in Fig. 4.

For supporting the sieve in a corner I provide the bails I I with faces $n\, n$, which are oppositely inclined and extend in planes at angles of forty-five degrees relatively to the faces $m\, m$.

For supporting the sieve against a projecting corner I provide the bails I I with faces $o\, o$, arranged near the center of the bails I I and extending oppositely in planes at angles of forty-five degrees relatively to the faces $m\, m$. Holes $l\, l$, for engaging the supporting-pins, are formed in each of the faces $m, n,$ and $o$.

The dotted lines in Fig. 4 indicate the walls of the surfaces against which the case A may be supported.

In using my improved flour-sieve the material to be sifted is placed in the chamber C after the sieve E has been connected to the spout B, the cover $h$ of the sieve is opened and drawn back, and the dish F is placed under the sieve. The user will then sift the substance through the screen $c$ by oscillating the handle $f$ of the sieve E, and thereby moving the agitator $d$ over the screen $c$. As the handle $f$ constitutes the handle for both the cup $b$ and the agitator $d$, the operator can accomplish the sifting by the use of only one hand, even when the cup $b$ is not connected to the spout B by the hooks $a\, a$. When a sufficient quantity of material has been sifted, the dish F will be removed and the cover $h$ can be closed against the bottom of the screen $c$, thereby completely closing the chamber C.

If desired, the sieve E may be used independently, in which case it will be unhooked from the spout B and used as an ordinary cup or sifter.

By hinging the cover $h$ to the cup $b$ by the link-hinge $i$, I am able to manipulate the cover $h$ within the chamber D to much better advantage, as with a link-hinge it is possible to raise the cover $h$ farther out of the way of the dish F, and to open and close it in a smaller space than would be possible with a cover which was hinged to the cup $b$ by an ordinary hinge. This method of hinging the cover $h$ also has the advantage that it enables the user to close the cover $h$ against the bottom of the screen $c$ more conveniently, since the flexibility of the hinge $i$ permits the cover $h$ to adapt itself to the bottom of the cup $b$, which is important, owing to the fact that flour is apt to collect in the corners of the cover $h$ at one point or another and thereby to interfere with the closing of the cover against the bottom of the cup $b$ unless the cover is flexibly hinged thereto.

When the flour-sieve is not in use the door G may be closed, and thereby the interior of the chamber D be kept clean.

What I claim is, in a sieve for sifting flour and similar substances, the following-defined novel features and combinations, substantially as hereinbefore set forth, viz:

1. In a flour receptacle and sifter, a closed case divided into two compartments by a tapering spout, and hooks pivoted to the sides of said spout, in combination with a sieve connected to said spout by said hooks, said sieve consisting of a cup with a bottom screen, and a handle for said cup mounted to oscillate in bearings thereon, an agitator constructed to move over the screen and provided with a stem extending thence vertically to the top of the cup, and thence horizontally above the handle, and thence downwardly into and through the handle axially thereof and fastened thereto, whereby the stem of the agitator forms the axle of the handle, a cover closing the bottom of said cup, said cover being hinged to said cup and fitting against its bottom below the screen, a link-hinge for connecting the cover to the cup, and a fastening for holding the cover against its bottom, substantially as set forth.

2. In a flour-receptacle, the case A, provided with a sieve and constructed with a supporting-bail on one of its sides, such bail constructed with a face parallel with the side of the case, and with two oppositely-inclined faces extending in planes at angles of forty-five degrees relatively thereto, whereby the bail will fit both parallel and angular surfaces.

In witness whereof I have hereunto signed my name in the presence of two subscribing witnesses.

MORRIS LARY.

Witnesses:
MURRAY HANSON,
WILLIAM H. BERRY.